Figure 1A:
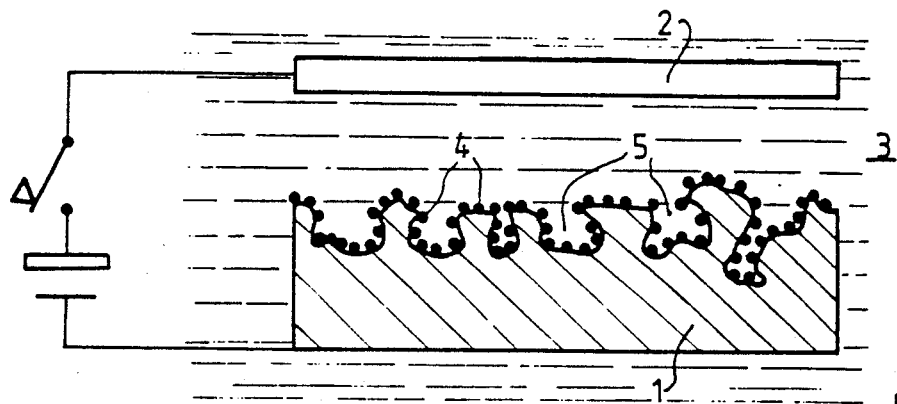

United States Patent [19]

Alperine et al.

[11] Patent Number: 5,110,422

[45] Date of Patent: May 5, 1992

[54] METHOD FOR PRODUCING AN ADHERENT METAL DEPOSIT ON CARBON, AND MIRROR OBTAINED BY THIS METHOD

[75] Inventors: Serge Alperine, Paris; Pierre Josso, Issy Les Moulineaux, both of France

[73] Assignee: Office National D'Etudes et de Recherches Aerospatiales, Bagneux, France

[21] Appl. No.: 626,593

[22] Filed: Dec. 12, 1990

[30] Foreign Application Priority Data

Dec. 13, 1989 [FR] France ................. 89 16486

[51] Int. Cl.$^5$ ............................... C25D 7/08
[52] U.S. Cl. ..................... 205/159; 427/419.7; 427/304; 427/162; 359/900; 359/883; 205/116; 205/222
[58] Field of Search ............... 350/609, 610, 641; 427/228, 305, 404, 162, 419.7; 204/19, 38.1

[56] References Cited

U.S. PATENT DOCUMENTS

| | | | |
|---|---|---|---|
| 4,444,467 | 4/1984 | Shuskus et al. | 359/900 |
| 4,451,119 | 5/1984 | Meyers et al. | 350/609 |
| 4,618,591 | 10/1986 | Okamura et al. | 501/90 |
| 4,623,228 | 11/1986 | Galasso et al. | 350/609 |
| 4,814,232 | 3/1989 | Bluege et al. | 427/163 |
| 4,976,899 | 12/1990 | Rousseau et al. | 427/419.7 |

FOREIGN PATENT DOCUMENTS

| | | |
|---|---|---|
| 176055 | 4/1986 | European Pat. Off. |
| 309593 | 4/1989 | European Pat. Off. |
| 323366 | 7/1989 | European Pat. Off. |
| 2552554 | 3/1985 | France |
| 958376 | 5/1964 | United Kingdom |
| 2081695 | 2/1982 | United Kingdom |

OTHER PUBLICATIONS

Stinton et al., Americal Ceramic Society Bulletin, vol. 61, No. 8, Aug. 1982, pp. 843–846.
Baudrand, Plating and Surface Finishing, vol. 71, No. 10, Oct. 1984, pp. 72–75.

Primary Examiner—John Niebling
Assistant Examiner—Kishor Mayekar
Attorney, Agent, or Firm—Armstrong, Nikaido, Marmelstein, Kubovick & Murray

[57] ABSTRACT

A surface layer of a material containing carbon and/or a carbide is produced on the outer surface of a solid carbon-based substrate (1) by selective application of material, said surface layer adhering strongly to the substrate, having a high specific surface area and having open pores (5) of a depth of at least 1 nm, and a metal material having a strong affinity for carbon, comprising at least one metal chosen from cerium, cobalt, chromium, iron, hafnium, iridium, osmium, palladium, platinum, rhodium, ruthenium, lanthanum, manganese, molybdenum, nickel, silicon, tantalum, thorium, titanium, uranium and tungsten, is deposited on said surface layer, substantially filling said pores.

The metal deposit (8) may be rectified and polished without peeling off, in order to produce a mirror of low inertia.

15 Claims, 2 Drawing Sheets

METHOD FOR PRODUCING AN ADHERENT METAL DEPOSIT ON CARBON, AND MIRROR OBTAINED BY THIS METHOD

The invention relates to a method for producing a metal deposit on a solid carbon-based substrate, in particular the production of mirrors of low inertia, more particularly for powerful laser beams.

A carbon-based substrate is here understood to be a substrate formed either from a material comprising at least 50% by weight of uncombined carbon or a composite material formed from a disperse phase and a matrix comprising at least 50% by weight of uncombined carbon.

The invention aims to produce a metal deposit on the external surface of a solid substrate, that is to say a substrate formed from a single block, which may be porous or non-porous, with the exclusion of a surface deposit of elementary particles of a divided substrate, these particles being, for example, in the form of grains or fibers.

French Patent Application 2,552,554 describes a method for the production of a mirror comprising, in particular, the deposition of a metal (rhenium, rhodium, molybdenum or tungsten) on a graphite substrate and the rectification of the metal coating to obtain a desired surface form. The abstract of this patent application indicates that it is known how to deposit perfectly adherent layers of these metals on graphite.

However, in the experience of the authors of the present invention, the adherence of any metal on graphite is a very difficult problem which the document under consideration provides no means of solving. An excellent adherence of the coating is necessary, on the one hand to enable mechanical machining of said coating without it tearing away and on the other hand so that the mirror withstands variations in temperature and the high temperature gradients due to the incidence of powerful rays, taking account of the difference between the coefficient of thermal expansion of carbon and those of the metals, which is very great even when the grade of graphite is chosen so as to limit it, as proposed in the prior application.

The aim of the invention is to provide a method enabling a metal deposit to be obtained which indeed has a strong adherence to the carbon-based substrate.

To this end, in the method according to the invention, a surface layer is produced on the surface of the substrate, which surface layer is formed by a porous pre-deposit of a material containing carbon and/or a carbide, adhering strongly to the substrate, having a high specific surface area and having a columnar structure with open pores of a depth of at least 1 nm, and a metal material having a strong affinity for carbon, comprising at least one metal chosen from cerium, cobalt, chromium, iron, hafnium, iridium, osmium, palladium, platinum, rhodium, ruthenium, lanthanum, manganese, molybdenum, nickel, silicon, tantalum, thorium, titanium, uranium and tungsten, is deposited on said surface layer, substantially filling said pores.

In a general manner, when it is indicated in the present description that a material or a layer contains or comprises a constituent it must be understood that this constituent is present in an appreciable or even predominant amount which may represent all or virtually all of the material or of the layer under consideration.

As the surface layer is formed by a porous pre-deposit of a material containing carbon and/or a carbide, its adherence to the substrate is due to the similarity in the chemical nature of the carbon of the substrate and the carbon of the surface layer, or to the chemical affinity between the carbon of the substrate and the carbide of the surface layer. This adherence is particularly high when the surface layer is obtained by pyrolysis, in particular from organic or organometallic compounds, or silanes.

The metal deposit proper also has a high affinity for carbon, linked to the existence of at least one binary compound between each of the metals chosen and carbon. However, this property does not lead to an adequate adherence of the metal coating to the substrate and also does not in itself lead to an adequate adherence to the surface layer. It is for this reason that it is necessary that said surface layer has a high specific surface area with open pores of a depth of at least 1 nm and that the metal deposit substantially fills said pores, this increasing the contact surface between the metal deposit and the surface layer and causing mutual mechanical bonding.

The thickness of the surface layer and the depth of its open pores are preferably between 1 nm and 100 $\mu$m and more particularly between 10 nm and 10 $\mu$m.

For its part, the metal deposit can be obtained by any method provided that it permits a good penetration of the deposit into the pores of the surface layer. For example, it is possible to produce a deposit by electrolytic means, after impregnation of the pores by the electrolytic bath, or a deposit by autocatalytic chemical means, or an electrophoretic deposit or a deposit by cementation at low pressure.

Of course, the metal coating may be formed from at least two layers which are of different materials and/or obtained by different deposition methods, for example two layers, the first of which is produced under conditions promoting a good filling of the pores and the second of which is produced under conditions suitable for allowing the desired coating thickness to be obtained rapidly, and/or for providing the desirable properties for the subsequent machining and the final use of the coated part.

Nickel and cobalt are the most common metals suitable for this deposit and can be used, on their own or together, to form at least the essential part of said deposit.

The carbon making up the substrate may be, for example, in the form of graphite or in vitreous or amorphous form. All partially graphitized and partially amorphous intermediate forms are possible, including the coal or petroleum tars which are graphitized to a greater or lesser extent. In the case where the substrate is made of a composite material, its disperse phase may be fibrous or granular and may or may not itself be based on carbon.

The method according to the invention also provides for the machining of the metal coating to obtain a part having a desired shape and surface condition, this machining comprising polishing to optical grade if necessary.

The invention also provides a part which is based on carbon provided with a metal coating and is obtained by the method defined above, and in particular a mirror polished to optical grade.

Figure 1B:
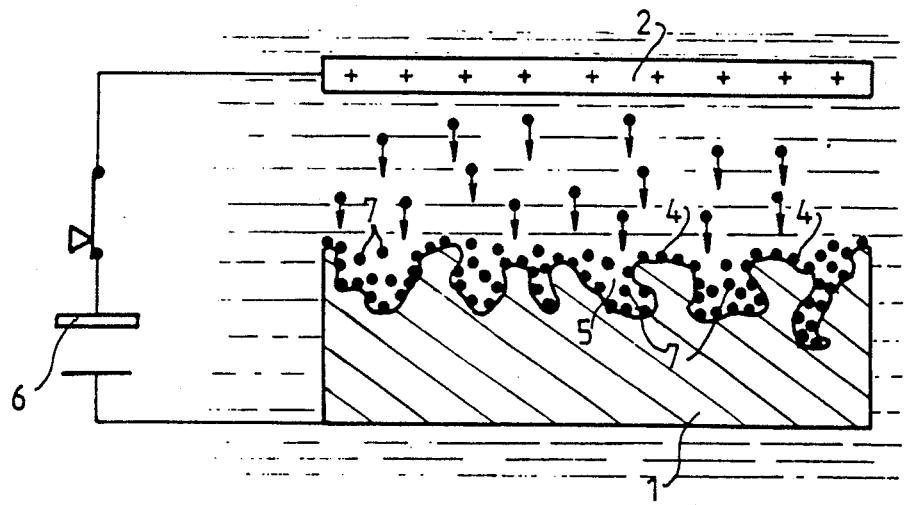
Figure 1C:
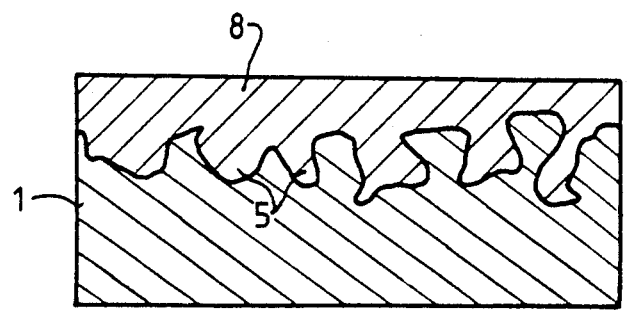
Figure 2A:
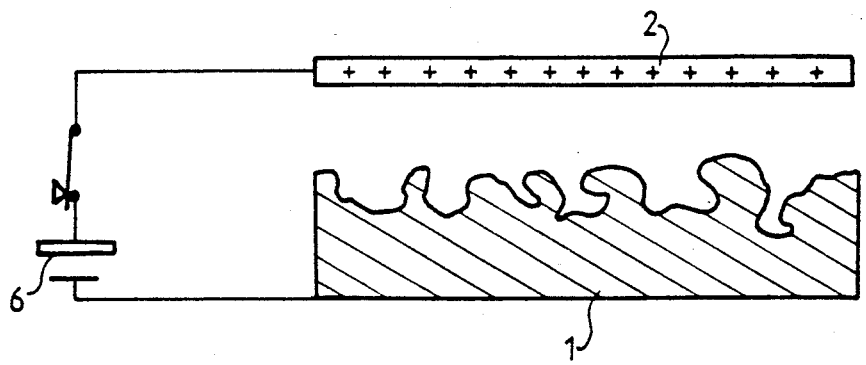
Figure 2B:
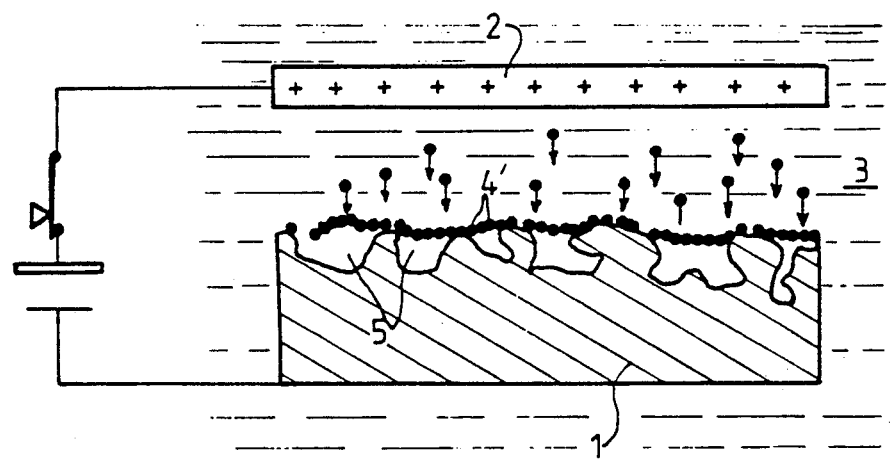
Figure 2C:
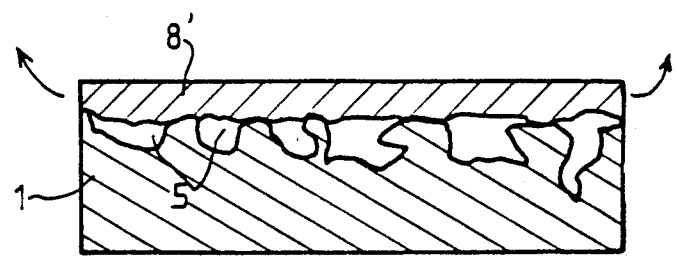

Other features and advantages of the invention will become apparent from the description below of a few illustrative embodiments, and from the appended drawings, in which:

FIGS. 1a, 1b and 1c show diagrammatically, respectively, two successive stages of a process for electrolytic deposition which can be used in the method according to the invention, and the resulting product; and FIGS. 2a, 2b and 2c illustrate diagrammatically, respectively, two stages of a modified method not according to the invention, and the resulting product, which is also not according to the invention.

EXAMPLE 1

The starting material is a previously rectified graphite parallelepiped of approximate dimensions $40 \times 20 \times 15$ mm$^3$.

A pre-deposit of carbon is produced by thermal decomposition of carbon-rich organic compounds. More precisely, a mixture containing 45% by weight of cyclohexane and 55% by weight of xylene is used. This is an azeotropic mixture, the boiling point of which is about 75° C. at atmospheric pressure, which enables a transport gas, such as argon, to be saturated easily.

The substrate is placed in a chamber flushed with a stream of argon (to prevent the presence of oxygen) and is brought to a temperature of 600° C. The dry argon is then replaced by argon saturated with the cyclohexane/xylene azeotropic mixture. Flushing is controlled, in a manner known per se, so that the velocity of the gas is virtually zero in the direction of flow and so that said flow is consequently of laminar type in the vicinity of the substrate. A carbon deposit of the type known as rough laminar is thus obtained.

This surface layer, or adaptation layer, of dark black color, has a thickness of about 1 µm. Its structure is columnar and porous, that is to say it is formed of columns separated by open pores extending throughout its thickness.

The substrate coated in this way is introduced without current into a bath for the electrolytic deposition of nickel having the following composition:
 nickel sulfamate: 350 g/l
 nickel chloride: 3.4 g/l
 boric acid: 30 g/l In addition to the main constituents above, this bath contains wetting agents and optionally brighteners. Its operating temperature is 45° C., the applicable current density being 3 A/dm$^2$.

Owing to the presence of the wetting agent, after immersion for about half an hour the pores of the surface layer or adaptation layer are virtually entirely impregnated with electrolyte. The part is then placed under current and nickel starts to deposit on the entire surface of the adaptation layer wetted with electrolyte, including the surface of the pores. The nickel deposit fills said pores and is continued until the thickness is 250 µm.

The deposit is rectified by successive passes of 0.02 mm until a homogeneous surface is obtained over the entire treated face. The deposit is then polished, no peeling of the metal layer being observed.

FIG. 1a shows diagrammatically the substrate 1 and an anode 2 already immersed for some time in the electrolyte 3 and still not polarized. Nickel ions 4 are present on the entire surface of the surface layer, including that of the pores 5.

In FIG. 1b the substrate 1 and the anode 2 are connected to a current source 6. The ions 4 are reduced on contact with the substrate while other nickel ions 7, originating from the bulk of the bath, in their turn penetrate into the pores 5 in order to be subsequently reduced. At the end of the operation, as shown in FIG. 1c, a nickel coating 8 is obtained which covers the surface of the substate 1 and is firmly anchored to the latter by penetration into the pores 5 of the surface layer.

If, as shown in FIG. 2a, the substrate 1 and the anode 2 had been polarized by means of the current source 6 before immersing them in the bath 3 (FIG. 2b), the nickel ions 4' would have reduced at the inlet of the pores 5 without penetrating into the latter and a deposit 8' (FIG. 2c) would have been obtained which was not anchored in the pores 5 and did not adhere adequately to the substrate 1.

EXAMPLE 2

The starting substrate is similar to that of Example 1.

The surface layer is produced by controlled oxidation, in accordance with the following method:

the substrate is introduced into a tubular furnace previously heated to 700° C.;

after having blocked the two ends of the laboratory tube, a waiting time of about 10 minutes, corresponding to the total consumption of the oxygen present, is allowed to elapse;

the furnace is cooled and the sample is removed when its temperature is below 400° C.

This treatment leads to a selective oxidation of the most active sites of the graphite, which makes the surface of the sample porous.

The deposition of nickel and the machining are then carried out as in Example 1.

EXAMPLE 3

A cylindrical substrate is used which has approximately a diameter of 40 mm and a thickness of 8 mm, has previously been rectified on its two large faces and is made of a composite material which is marketed under the name AEROLOR 30 and is formed of carbon fibers woven in three orthogonal directions and a carbon matrix.

A pre-deposit and a metal deposit are produced and machining is carried out, as described in Example 1, the thickness of the nickel deposit however being only 200 µm.

EXAMPLE 4

The procedure is as in Example 3, replacing the pyrolytic pre-deposition of carbon described in that example by a deposit produced chemically by vapor phase deposition at low pressure, marketed by LE CARBONE LORRAINE under the name "Carbone pyrolytique mince 5/146" ("Thin pyrolytic carbon 5/146").

The thickness of the nickel deposit is 250 µm.

EXAMPLE 5

The procedure is as in Example 4, the deposit produced chemically by vapor phase deposition at low pressure being that marketed by LE CARBONE LORRAINE under the name "Carbone pyrolytique epais 5/145" ("Thick pyrolytic carbon 5/145").

EXAMPLE 6

A cylindrical substrate is used which has a diameter of 40 mm and a thickness of 7 mm and is made of a composite material marketed under the name AEROLOR 20, formed from carbon fibers oriented in two directions and a carbon matrix.

This substrate is treated as described in Example 5.

EXAMPLE 7

A cylindrical substrate is used which has a diameter of 40 mm and a thickness of 10 mm and is made of a composite material marketed under the name AEROLOR OO, formed from short carbon fibers dispersed isotropically in a carbon matrix.

This substrate is treated as described in Example 4.

EXAMPLE 8

In this example a substrate similar to that of Example 7 is subjected to the treatment described in Example 5.

EXAMPLE 9

The substrate and the pre-deposit are the same as in Example 7.

The sample is then immersed for 10 minutes in a 2.06M hydrazine solution (100 ml/l of hydrazine hydrate) containing 10 ml/l of wetting agent. The sample is then plunged into an ultra-pure auto-catalytic chemical nickel bath as described in French Patent 2 590 595. Deposition starts as soon as the operating temperature of 90°±2° C. is reached. An ultra-pure chemical nickel deposit 50 μm thick is obtained, the free surface of which is strictly parallel to the initial surface, the growth of the auto-catalytic chemical nickel deposit being strictly perpendicular to the surface of the substrate.

After polishing, no peeling of the deposit is found.

EXAMPLE 10

This example differs from Example 9 solely in respect of the pre-deposit of carbon, which is produced as in Example 5.

EXAMPLE 11

A substrate of the same nature as in Examples 7 to 10 is used, in the form of a disk having a diameter of 40 mm and a thickness of 8 mm.

The treatment differs from that in Example 9 in that the pre-deposit of carbon is replaced by a pre-deposit of silicon carbide.

To produce this pre-deposit, the sample is introduced into a chamber which is under a reduced pressure (pressure of between 33 and 133 Pa). It is heated to a temperature of between 1,100° and 1,150° C. and tetramethylsilane in the vapor state is then injected into the chamber and pyrolyzes to give silicon carbide.

A black-colored deposit having a thickness which does not exceed 3 μm is obtained in half an hour. The operating conditions are chosen in a manner known per se to obtain a deposit morphology of fine-grained columnar growth, the growth columns of which are not linked to one another, such that the deposit has a high surface porosity.

EXAMPLE 12

The procedure is as in Example 11 up to the chemical deposition of nickel, the thickness of which is restricted to 25 μm.

An electrolytic deposition of nickel, of 250 μm thickness, is then carried out, followed by a rectification and polishing as described in Example 1.

The intermediate chemical deposition of nickel makes it possible then to carry out the electrolytic deposition of nickel, despite the absence of electrical conductivity of the silicon carbide pre-deposit.

This example illustrates the possibility of producing at least two successive metal layers by different techniques. In the same way it is possible successively to deposit layers of different metals.

In all of the above examples, any rectification and polishing did not give rise to any peeling of the deposit, which shows its excellent adherence to the substrate.

EXAMPLE 13

The substrate and the pre-deposition treatment are the same as in Example 7.

An electrolytic deposition of cobalt is then carried out using a bath having the following composition:
cobalt sulfate heptahydrate: 337 g/l
cobalt chloride hexahydrate: 50 g/l
boric acid: 37 g/l
pH3 to 4.

In addition to the main constituents above, this bath contains wetting agents and optionally brighteners. Its operating temperature is 50° C., the applicable current density being 3 A/dm$^2$.

Voltage is applied after impregnation for half an hour as described in Example 1.

The treatment is continued until a perfectly adhering cobalt deposit 100 μm thick is obtained.

EXAMPLE 14

The procedure is as in Example 4, the machining operations ending with thorough polishing to optical grade. A mirror is obtained which has only one visible polychromatic light fringe, which indicates that the thickness of its surface irregularities does not exceed 0.1 μm.

This characteristic is retained after ten cycles of heating to 160° C. and rapid cooling.

An identical mirror was examined by laser interferometry techniques. Heating was provided by a jet of air of controlled temperature on the rear face. At 80° C. this mirror showed only two fringes.

Another mirror was also examined by laser interferometry techniques, providing heating by means of a $CO_2$ laser, the power absorbed by the mirror being 10 W/cm$^2$. After illuminating several tens of times for a period of 5 seconds, the mirror showed only a single fringe in the visible.

By way of comparison it was attempted to produce a mirror under the same conditions but omitting the adaptation layer of pyrolytic carbon. The nickel coating peeled off during polishing.

EXAMPLE 15

It is proposed to produce a plane mirror on a carbon-based substrate using the technique known as "optical replication".

In order to do this, a cylindrical substrate having a diameter of 40 mm and a thickness of 10 mm is used which is made of a composite material marketed under the name AEROLOR OO and is formed of short carbon fibers dispersed isotropically in a carbon matrix.

This substrate receives the pre-deposit, or adaptation layer, described in Example 4.

Also, a plane and perfectly polished counter-form, commonly termed a "master", of the surface to be reproduced on the substrate is prepared.

The substrate is then coated with a layer of adhesive consisting of one or more polymerizable resins. A thin foil of nickel or aluminum, known for its reflecting properties, is placed on the adhesive. The thickness of the metal foil can be between 10 and 50 μm.

The master is then applied to the substrate+adaptation layer+adhesive+metal foil assembly using a press. During this operation the adhesive penetrates into the pores of the adaptation layer and ensures perfect wetting of the metal foil. This pressure is applied for the time necessary for polymerization of the adhesive.

After separating the master from the mirror thus formed, it is found that a reflecting surface has been obtained which has the same optical grade as the counter-form and adheres perfectly to the carbon-based substrate.

To date is has not been possible to apply this technique, which is otherwise known and which enables optically treated mirrors to be manufactured in a single operation, to carbon-based subtrates because of the poor adherence of adhesives to this type of material.

The addition of an adaptation layer having a high specific surface area and having open pores allows mechanical bonding of the adhesive in said pores and, thus, the manufacture of a mirror by this technique.

We claim:

1. A method for producing an adherent deposit on an outer surface of a solid carbon-based substrate, which comprises:
   (1) forming a porous layer having a strong adhesion to the substrate, a high specific surface area and a columnar structure with open pores of a depth of at least 1 nm by depositing on the substrate a material comprising at least one member selected from the group consisting of carbon and a carbide; and
   (2) depositing on the porous layer a material having a strong affinity for carbon so as to substantially fill said pores, wherein said material having a strong affinity for carbon comprises at least one element selected from the group consisting of cerium, cobalt, chromium, iron, hafnium, iridium, osmium, palladium, platinum, rhodium, ruthenium, lanthanum, manganese, molybdenum, nickel, silicon tantalum, thorium, titanium, uranium and tungsten.

2. The method of claim 1, wherein the thickness of the porous layer and the depth of its open pores are between 1 nm and 10 μm.

3. The method of claim 2, wherein said thickness of the porous layer and the depth of its open pores are between 10 nm and 10 μm.

4. The method of any one of claims 1–3, wherein the porous layer comprises pyrolytic carbon.

5. The method of any one of claims 1–3, wherein the porous layer comprises silicon carbide obtained by pyrolysis of a silane.

6. The method of any one of claims 1–3, wherein said material having a strong affinity for carbon is deposited electrolytically in an electrolytic bath after impregnation of the pores of the porous layer by the electrolytic bath, wherein no current is applied until the pores have been impregnated by the electrolytic bath.

7. The method of any one of claims 1–3, wherein said material having a strong affinity for carbon is deposited by autocatalytic control chemical means.

8. The method of any one of claims 1–3, wherein said material having a strong affinity for carbon is at least one element selected from the group consisting of nickel and cobalt.

9. The method of any one of claims 1–3, wherein the substrate comprises at least 50% by weight of uncombined carbon.

10. The method of any one of claims 1–3, wherein the substrate is a composite material formed from a disperse phase and a matrix comprising at least 50% by weight of uncombined carbon.

11. The method of any one of claims 1–3, wherein carbon of the substrate is at least partially amorphous.

12. The method of any one of claims 1–3, wherein carbon of the substrate is at least partially in the form of graphite.

13. The method of any one of claims 1–3, wherein said adherent deposit is machined to obtain a part having a desired shape and surface condition.

14. The method of claim 13, wherein said adherent deposit is polished to optical grade.

15. A carbon-based part provided with an adherent deposit obtained by the method of any one of claims 1–3.

* * * * *